United States Patent [19]

Hechenberger et al.

[11] Patent Number: 4,467,079

[45] Date of Patent: Aug. 21, 1984

[54] CURING COMPOSITIONS CONTAINING REDOX INDICATORS

[75] Inventors: Dieter A. Hechenberger, Sinsheim; Hans J. Gollub, Buehl, both of Fed. Rep. of Germany

[73] Assignee: Lingner & Fischer GmbH, Fed. Rep. of Germany

[21] Appl. No.: 441,064

[22] Filed: Nov. 12, 1982

[30] Foreign Application Priority Data

Nov. 13, 1981 [GB] United Kingdom ............... 8134288

[51] Int. Cl.$^3$ ............................ C08K 5/13; C09J 5/04
[52] U.S. Cl. .................................... 526/90; 526/204; 526/212; 526/217; 526/220; 526/222
[58] Field of Search ............... 526/212, 204, 217, 90, 526/220, 222

[56] References Cited

U.S. PATENT DOCUMENTS

| | | | |
|---|---|---|---|
| 2,400,041 | 5/1976 | Dickey | 526/212 |
| 3,382,296 | 5/1968 | Tenquist | 525/25 |
| 4,065,430 | 12/1977 | Satomura | 526/212 |
| 4,096,201 | 6/1978 | Kishi et al. | 524/487 |
| 4,232,136 | 11/1980 | Kovacsay | 525/327 |

FOREIGN PATENT DOCUMENTS

| | | |
|---|---|---|
| 2445715 | 4/1976 | Fed. Rep. of Germany . |
| 1110384 | 4/1968 | United Kingdom . |
| 2061295 | 5/1981 | United Kingdom . |

OTHER PUBLICATIONS

Chem. Abstract, vol. 85, 1976, Entry 34263h.
Chemie Lexikon, vol. 3, Fifth Edition (1963), Frank'sche Verlagshandling, Stuttgart, cols. 4248–4256.

Primary Examiner—Joseph L. Schofer
Assistant Examiner—Peter F. Kulkosky
Attorney, Agent, or Firm—Jacobs & Jacobs

[57] ABSTRACT

A curing composition consisting of two components, one of the components comprising a vinyl monomer and an initiator of polymerization, the other component comprising an accelerator of polymerization, characterized in that the composition further comprises a redox indicator having $E_o$ from above +0.01 to below +0.76 volts and $R_H$ from 13.5 to 28.

7 Claims, No Drawings

CURING COMPOSITIONS CONTAINING REDOX INDICATORS

The present invention relates to compositions such as adhesives, fillers, casting resins and road surface markings which cure or set due to polymerisation of vinyl monomers.

Curing compositions are well known in the adhesives and allied arts and generally consist of two components which are stable when kept separate. One component comprises a vinyl monomer and a polymerisation initiator, the other a polymerisation accelerator. When the two components are mixed the combined effect of initiator and accelerator causes the monomer to polymerise and the composition cures. As the polymerisation progresses, the composition becomes more viscous and eventually the high viscosity leads to poor surface-wetting and hence poor adhesion. There is, therefore, only a limited time between mixing and curing during which the composition may be used. Hitherto it has been necessary to judge the progress of the polymerisation by touch, and this subjective method of testing depends for its accuracy on the sense of touch and skill of the user.

It has now been found that an objective assesment of the polymerisation process can be achieved by including a redox indicator in one or other of the components of the composition. Such indicators change from one colour to another, or from coloured to colourless when the processing time has been exceeded, i.e. when the polymerisation is sufficiently advanced that the composition should no longer be used. Suitable redox indicators have a redox potential, $E_o$ of from +0.01 to +0.76 volts and $R_H$ of from 13.5 to 28.

Accordingly the present invention provides a curing composition consisting of two components, one of the components comprising of vinyl monomer and an initiator of polymerisation, the other component comprising an accelerator of polymerisation, characterised in that the composition further comprises a redox indicator having $E_o$ from above +0.01 to below +0.76 volts and $R_H$ from 13.5 to 28.

Suitable vinyl monomers for use in compositions of the present invention are well known in the art. Examples include methyl methacrylate, tetrahydrofurfuryl methacrylate, ethyl methacrylate, methyl acrylate, butyl methacrylate, glycidyl methacrylate, acrylic acid, 2-ethyl hexylacrylate, hexylacrylate, butyl acrylate, 2-ethylhexylmethacrylate, hexylmethacrylate, cyclohexylmethacrylate, methylstyrene and dimethyl styrene.

Polymerisation initiators are generally organic peroxides or hydroperoxides and are well known in the art. Examples include cumene hydroperoxide, benzoyl peroxide, t-butylhydroperoxide, di-t-butylperoxide, t-butylperoxybenzoate, -t-butylperoxy-2-ethylhexanoate, and dilauroylperoxide.

Polymerisation accelerators are also well known in the art. Examples include thioureas such as tetramethylthiourea, ethylenethiourea, acetylthiourea, diethylthiourea, dibutylthiourea, trimethylthiourea, diphenylthiourea, ditolylthiourea, thiourea, tetrahydro-3, 5-dimethyl-4UNS/H/ -1,3,5-oxadiazin-4-thione and mercaptobenzimidazole; tertiary amines such as diethyl-p-toluidine, dimethyl-p-toluidine, diisopropanol-p-toluidine, triethylamine, tripropylamine, ethyldiethanolamine and N,N-dimethylaniline; quaternaryammonium salts such as tetramethylammonium chloride and tetraethylammonium chloride; oximes such as methylisobutylketoxime, methylethylketoxime and acetophenonoxime; thioethers such as 2,2'-thiodiethanol and 2,2'-thiodipropionitrile; organic sulphonyl chlorides such as methylchlorosulphite, n-propylchlorosulphite and phenylchlorosulphite; trichloroacetate, and organic and inorganic salts of metals such as copper, titanium, cobalt, vanadium, chromium, iron and manganese including the acetylacetonate and naphthenate salts.

Suitable redox indicators for use in the present invention include the alkali metal salts of dichlorophenolindophenol (i.e. 2,6-dichloro-N-(4-hydroxyphenyl)-1,4-benzoquinonimine), m-cresolindophenol and thymolindophenol particularly the sodium salts thereof. The preferred indicator is sodium dichlorophenolindophenol, which has $E_o$ +0.23 volts and $R_H$ of 20–22.5. In the oxidised form all three of these compounds are blue whereas the reduced form is colourless, or red at low pH. Such indicators are particularly useful when it is desireable for the cured composition to be colourless.

The indicator may be incorporated in either component of the composition, the colour displayed depending upon which component contains the indicator. In the case of the three indicators named above they will be red when incorporated in the same component as the initiator or colourless when in the same component as the accelerator. On mixing these two components, the indicator adopts the oxidised form and displays the appropriate red colour, and changes to the colourless reduced form when the processing time of the composition is complete.

Compositions according to the present invention may include various accessory ingredients in either or both components. In addition the component containing the accelerator may also contain further vinyl monomer. It will be appreciated that mixtures of various vinyl monomers may also be employed in the present compositions when it is desired to form copolymers to achieve particular properties in the cured composition.

Typical compositions of the present invention comprise from 1 to 10% w/w, preferably 4 to 5%, of an initiator, from 1 to 10% w/w, preferably 2.5 to 5%, of an accelerator, from 0.005 to 0.1% w/w, preferably about 0.01 to 0.02% of the indicator, the remainder being vinyl monomer and optional accessory ingredients. The vinyl monomer may all be included in one component which additionally comprises the initiator, or it may be divided between the two components. The indicator may be present in either component or divided between the components.

In certain cases the vinyl monomer may tend to polymerise in the presence of an initiator only, for instance in so-called "anaerobic" adhesives. Such polymerisation is prevented by permitting atmospheric oxygen to dissolve in the component containing the vinyl monomer and initiator. The act of placing the adhesive between two surfaces which are impermeable to oxygen is sufficient to exclude oxygen and permit polymerisation to take place. Alternatively, the polymerisation may be prevented by including an inhibiting substance such as a di-functional vinyl monomer in the component containing the initiator.

Compositions according to the present invention are produced by admixing the ingredients of each component. The two components are stored separately until required for use.

The use of indicators according to the present invention has the further advantages that the colour imparted to a component by the indicator can be used to distinguish between the two components, and it can be ascertained that the components are completely mixed when the colour is uniform throughout the composition.

The invention will now be illustrated by reference to the following Examples which do not limit the invention in any way.

Adhesive 4 = Benzoylperoxide/tert.amine

Colour changes of the indicators were observed and recorded. The results are given in Table 1.

EXAMPLE I

TABLE I

|  | $E_o(V)$ | $R_H$ | Adhesive 1 start | Adhesive 1 end | Adhesive 2 start | Adhesive 2 end | Adhesive 3 start | Adhesive 3 end | Adhesive 4 start | Adhesive 4 end |
|---|---|---|---|---|---|---|---|---|---|---|
| Methylene Blue | +0,01 | 13,5–15,5 | blue/green | blue/green | blue | blue | blue | blue | green | slightly green |
| Thionine | +0,06 | 15–17 | grey | blue | grey | blue/grey | colourless | slightly blue | grey/green | grey |
| Toluylene Blue | +0,11 | 16–18 | blue | grey | blue | blue/grey | blue | grey/blue | dark-green | grey/blue |
| Thymolindophenole | +0,18 | 17,5–20 | red | slightly red | pink | colourless | pink | colourless | red | red |
| m-Cresolindophenole | +0,21 | 19–21,5 | red | colourless | pink | colourless | pink | colourless | pink | colourless |
| 2,6-Dichlorophenol-indophenole-Na | +0,23 | 20–22,5 | violet | colourless | violet | colourless | red | colourless | pink | colourless |
| Diphenylamine | +0,76 | 25–28 | without effect | | | | | | | |

EXAMPLE 1

| | | Parts by Weight |
|---|---|---|
| Component A | | |
| Methylmethacrylate | (monomer) | 70.0 |
| Acryl nitrile butadiene rubber | | 5.0 |
| Cumene hydroperoxide | (initiator) | 5.0 |
| Methacrylic acid | | 10.0 |
| Polymethyl methacrylate | | 10.0 |
| | | 100.0 |
| Component B | | |
| Methylmethacrylate | (monomer) | 79.99 |
| Acryl nitrile butadiene rubber | | 5.00 |
| Tetramethyl thiourea | (accelerator) | 5.00 |
| 2,6-dichlorophenolindophenol sodium salt | (indicator) | 0.01 |
| Polymethylmethacrylate | | 10.00 |
| | | 100.00 |

EXAMPLE 2

| | | |
|---|---|---|
| Component A | | |
| Tetrahydrofurfurylmethacrylate | (monomer) | 69.0 |
| Acryl nitrile butadiene rubber | | 5.0 |
| Cumene hydroperoxide | (initiator) | 4.0 |
| Methacrylic acid | | 8.0 |
| Ethyleneglycoldimethacrylate | | 4.0 |
| Polymethylmethacrylate | | 10.0 |
| | | 100.0 |
| Component B | | |
| Tetrahydrofurfurylmethacrylate | (monomer) | 82.48 |
| Acryl nitrile butadiene rubber | | 5.00 |
| Ethylene thiourea | (accelerator) | 2.50 |
| 2,6-dichlorophenolindolphenol sodium salt | (indicator) | 0.02 |
| Polymethylmethacrylate | | 10.00 |
| | | 100.00 |

EXAMPLE 3

Various indicators were used in component B (containing accelerator) of standard adhesives compositions containing the following initiator-accelerator systems:

Adhesive 1 = Cumenehydroperoxide/Tetramethylthiourea

Adhesive 2 = Cumenehydroperoxide/Ethylene thiourea

Adhesive 3 = Cumenehydroperoxide/Thioketone

We claim:

1. In a two-component curing composition consisting of two components, in which one of than initiator of polymerisation, and the other component comprises an accelerator of polymerisation, the improvement wherein the composition further comprises a redox indicator having $E_o$ from above +0.01 to below +0.76 volts and $R_H$ from 13.5 to 28.

2. A composition according to claim 1 wherein the vinyl monomer is selected from methyl methacrylate, tetrahydrofurfuryl methacrylate, ethyl methacrylate, methyl acrylate, butyl methacrylate, glycidyl methacrylate, acrylic acid, 2-ethyl hexylacrylate, hexylacrylate, butyl acrylate, 2-ethylhexylmethacrylate, hexylmethacrylate, cyclohexylmethacrylate, methylstyrene and dimethyl styrene.

3. A composition according to claim 1 wherein the polymerisation initiator is selected from cumene hydroperoxide, benzoyl peroxide, t-butylhydroperoxide, di-t-butylperoxide, t-butylperoxybenzoate, t-butylperoxy-2-ethylhexanoate, and dilauroylperoxide.

4. A composition according to claim 1 wherein the polymerisation accelerator is selected from tetramethylthiourea, ethylenethiourea, acetylthiourea, diethylthiourea, dibutylthiourea, trimethylthiourea, diphenylthiourea, ditolylthiourea, thiourea, tetrahydro-3, 5-dimethyl-4H-1,3,5-oxadiazin-4-thione, mercaptobenzimidazole, diethyl-p-toluidine, dimethyl-p-toluidine, diisopropanol-p-toluidine, triethylamine, tripropylamine, ethyldiethanolamine, N,N-dimethylaniline, tetramethylammonium chloride, tetraethylammonium chloride, methylisacetophenonoxime, 2,2'-thiodiethanol, 2,2'-thiodipropionitrile, methylchlorosulphite, n-propylchlorosulphite, phenylchlorosulphite, trichloroacetate and copper, titanium, cobalt, vanadium, chromium, iron and manganese acetylacetonate and naphthenate salts.

5. A composition according to claim 1 wherein the redox indicator is selected from alkali metal salts of dichlorophenolindophenol (ie. 2,6-dichloro-N-(4-hydroxyphenyl)-1,4-benzoquinonimine), m-cresolindophenol and thymolindophenol.

6. A composition according to claim 1 wherein the redox indicator is incorporated in the same component as the polymerisation accelerator.

7. A composition according to claim 1 and comprising from 1 to 10% w/w, of an initiator, from 1 to 10% w/w of an accelerator and from 0.005 to 0.1% w/w of the indicator, the remainder being vinyl monomer and optional accessory ingredients.

* * * * *

UNITED STATES PATENT AND TRADEMARK OFFICE
CERTIFICATE OF CORRECTION

PATENT NO. : 4,467,079
DATED : August 21, 1984
INVENTOR(S) : DIETER ANTON HECHENBERGER ET AL.

It is certified that error appears in the above-identified patent and that said Letters Patent are hereby corrected as shown below:

Claim 1, line 2, delete "than" and insert

-- the components comprises a vinyl monomer and an --.

Signed and Sealed this

Eighth Day of January 1985

[SEAL]

Attest:

GERALD J. MOSSINGHOFF

*Attesting Officer*  *Commissioner of Patents and Trademarks*